United States Patent Office 3,014,270
Patented Dec. 26, 1961

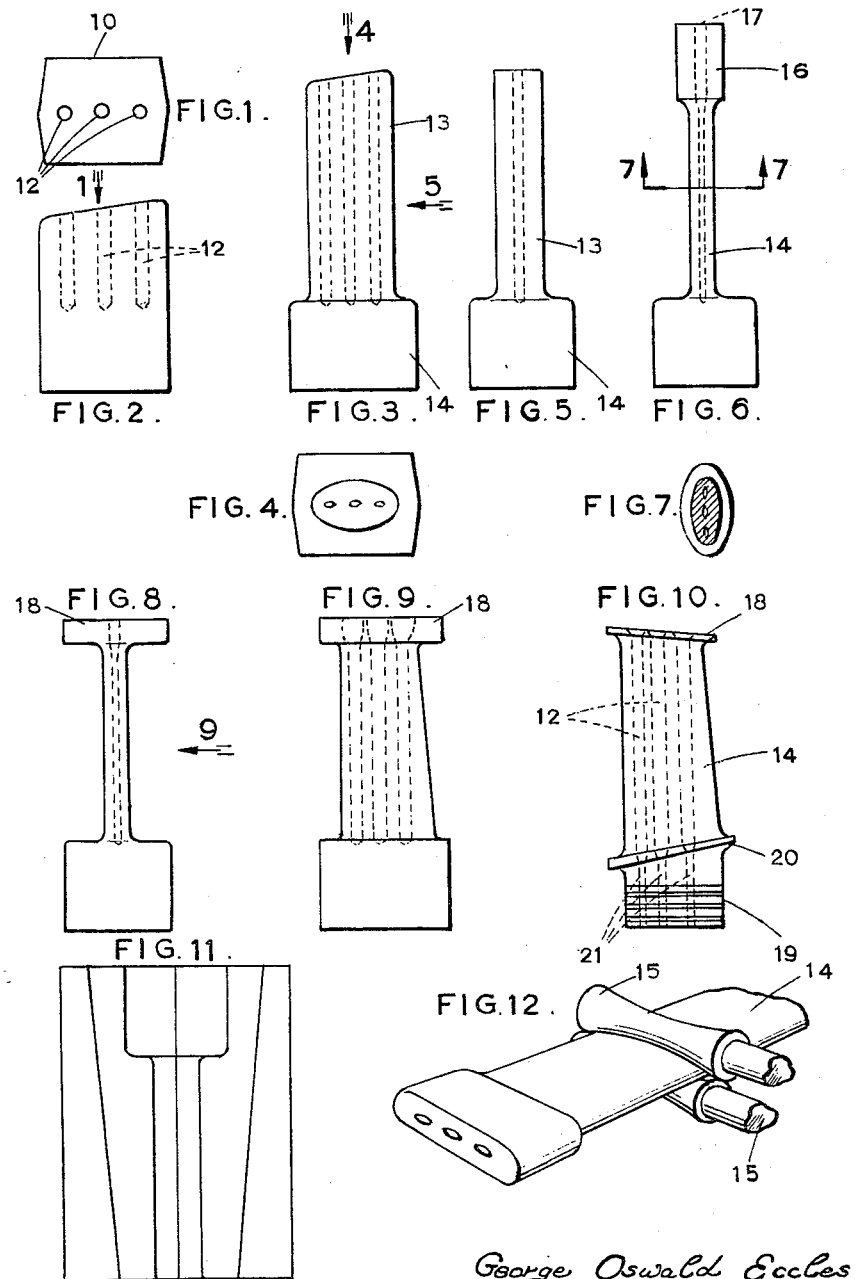

3,014,270
METHOD OF MANUFACTURING TURBINE BLADES
George Oswald Eccles, Barrowford, England, assignor to Rolls-Royce Limited, Derby, England, a British company
Filed Feb. 10, 1959, Ser. No. 792,365
Claims priority, application Great Britain Feb. 27, 1958
7 Claims. (Cl. 29—156.8)

This invention relates to the manufacture of blades and particularly to the manufacture of turbine blades from metals capable of withstanding high temperatures such as nickel chrome alloys which are difficult to work.

An object of the invention is to provide an extruded blade having a root portion, a blade portion and a shroud portion, and to provide a process of manufacture which enables the shroud portion to be formed from the same billet of material as those from which the remainder of the blade is made.

According to the invention the method of making the blade includes producing a billet, extruding a portion of the billet to a greater cross-sectional area than is required for the final operative blade portion, rolling to a less cross-sectional area an intermediate part of the extruded portion which is to form the blade portion leaving at the end remote from the non-extruded portion a part of greater cross-sectional area than the intermediate part, the blade thus having portions of larger cross-section than the blade portion at each end constituted by the unextruded portion and the extruded but unrolled portion and forming one of said portions into a tip shroud and the other into a root.

The extruded but unrolled portion may be upset to form a tip shroud and the non-extruded portion formed into the the blade root or the extruded but unrolled portion may be upset to form a root and the tip shroud formed from the non-extruded portion. In either case the blade root may have a platform portion formed with it.

If desired, holes can be drilled axially in the billet to provide passages for cooling or heating fluid in the final blade. Thus these holes may be drilled mechanically prior to the extrusion of the billet and filled with a filler material prior to extrusion whereby they will be elongated in cross section during the extrusion.

Alternatively, holes can be electrically drilled, for example anodically, at any stage in the process of manufacture of the blade.

In the accompanying drawings are shown the various stages in a process according to this invention in which the extruded but unrolled portion is upset to form a tip shroud:

FIGURE 1 is a plan of a drilled billet;
FIGURE 2 is a side elevation of the same billet;
FIGURES 3, 4 and 5 are respectively a side elevation, plan and end elevation of the same billet after extrusion;
FIGURE 6 is an end elevation of the billet after an intermediate part of the extruded portion has been rolled to be of less section than the extruded and non-extruded ends;
FIGURE 7 is a section on line 7—7 shown in FIGURE 6;
FIGURES 8 and 9 are respectively end and side elevations of the billet after the shroud portion has been upset;
FIGURE 10 is a side elevation of the finished blade;
FIGURE 11 is a section through an extrusion die used to produce the extrusion shown in FIGURE 3; and
FIGURE 12 shows diagrammatically a method of rolling the intermediate part of the extruded portion to produce the shape shown in FIGURES 6 and 7.

In producing a turbine blade according to the invention a billet 10 of nickel chrome alloy is drilled to produce bores 12. The bores are then filled with rods of mild steel. The billet 10 is then partially extruded in a split extrusion die of the shape shown in FIGURE 11 to produce an extruded portion 13 of less cross-section than the non-extruded portion 14. The extruded portion 13 is of greater cross-sectional area than is required for the final operative blade portion. The die and billet are lubricated during extrusion as described in U.S.A application No. 702,519 by metal plating the billet and applying colloidal graphite to the die surface.

An intermediate part $14^1$ of the extruded portion 13 is then rolled, for example with the rollers shown at 15 in FIGURE 12, and this intermediate part is reduced in cross-section by the rolling and is elongated.

The remaining extruded portion 16 is then upset by pressure applied to the end 17 (FIGURE 6) so as to produce a shroud portion 18 (FIGURES 8 and 9).

To complete manufacture of the blade the non-extruded portion 14 is machined to produce a conventional fir tree root 19 and a platform 20, the extruded and rolled portion $14^1$ is machined to produce a finished blade surface, and the shroud portion 18 is machined to produce the finished shroud.

The mild steel filler rods are removed by nitric acid at a stage after the rolling.

In addition, holes 21 are drilled in the root portion to meet the inner ends of the holes 12 so as to complete the cooling fluid passages.

Obviously holes 12 and 21 can be produced by other methods, for example, by electrical drilling such as anodic drilling as described in U.S.A. application No. 697,456.

An alternative application of the invention lies in the production of the root portion of the blade by upsetting a portion corresponding to the unrolled extruded portion described above and forming the unextruded portion into a tip shroud. The initial extrusion and rolling operations will be the same.

I claim:
1. The method of making from a billet a relatively thin flattened blade for an internal combustion turbine engine of the type which carries a tip shroud integral with the blade which method includes extruding a portion of the billet to a greater cross-sectional area than is required for the final operative blade portion leaving a non-extruded portion at one end thereof, rolling to a less cross-sectional area an intermediate part of the extruded portion which is to form the blade portion leaving at the end remote from the non-extruded portion a part of greater cross-sectional area than the intermediate part, the blade thus having portions of larger cross-section than the blade portion at each end constituted by the unextruded portion and the extruded but unrolled portion and forming one of said portions into a tip shroud and the other into a root.

2. A method as claimed in claim 1 in which the non-extruded portion is machined to make a root and the extruded but unrolled portion is upset to make a shroud.

3. A method according to claim 1 in which the unextruded portion is formed into a tip shroud and the extruded but unrolled portion is upset to form a root.

4. The method claimed in claim 1 in which the non-extruded portion is machined to produce a conventional fir tree root portion and a platform, the extruded and rolled portion is machined to produce a blade surface and the extruded but unrolled portion is upset by pressure and machined to produce a tip shroud.

5. A method according to claim 1 in which the non-extruded portion is machined to form a tip shroud, the rolled portion is machined to form the finished blade and the extruded but unrolled portion is upset to form a root portion and a platform.

6. The method claimed in claim 1 in which cylindrical holes are drilled axially of the billet through only the portion to be extruded to produce passages through the blade for a heat transfer fluid, said passages being first flattened by the extrusion and subsequently additionally flattened by the rolling.

7. The method claimed in claim 6 in which the holes are drilled axially of the billet and filled with filler material prior to the extrusion.

References Cited in the file of this patent

UNITED STATES PATENTS

| | | |
|---|---|---|
| 1,536,777 | Oay | May 5, 1925 |
| 1,772,876 | Parsons et al. | Aug. 12, 1930 |
| 1,910,943 | Wiberg et al. | May 23, 1933 |
| 2,044,293 | Handler | June 16, 1936 |
| 2,638,663 | Barlett et al. | May 19, 1953 |
| 2,891,307 | Betteridge | June 23, 1959 |

FOREIGN PATENTS

| | | |
|---|---|---|
| 459,742 | Great Britain | Jan. 14, 1937 |